United States Patent
Keating et al.

(10) Patent No.: US 9,946,371 B2
(45) Date of Patent: Apr. 17, 2018

(54) SYSTEM AND METHOD FOR USING TOUCH ORIENTATION TO DISTINGUISH BETWEEN USERS OF A TOUCH PANEL

(71) Applicant: QUALCOMM Incorporated, San Diego, CA (US)

(72) Inventors: Virginia Walker Keating, San Diego, CA (US); Suhail Jalil, Poway, CA (US); Mohamed Imtiaz Ahmed, San Marcos, CA (US); Robert Scott Tartz, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/515,906

(22) Filed: Oct. 16, 2014

(65) Prior Publication Data

US 2016/0109969 A1  Apr. 21, 2016

(51) Int. Cl.
*G06F 3/0354* (2013.01)
*G06F 3/041* (2006.01)
*G06F 3/0488* (2013.01)

(52) U.S. Cl.
CPC .......... *G06F 3/03547* (2013.01); *G06F 3/041* (2013.01); *G06F 3/0488* (2013.01)

(58) Field of Classification Search
CPC ..... G06F 3/03547; G06F 3/041; G06F 3/0488
USPC ........................................................ 345/173
See application file for complete search history.

(56) References Cited

U.S. PATENT DOCUMENTS

| | | | |
|---|---|---|---|
| 6,791,530 B2 * | 9/2004 | Vernier | G06F 3/048 345/156 |
| 7,552,402 B2 * | 6/2009 | Bilow | G06F 3/0488 345/173 |
| 8,125,458 B2 | 2/2012 | Keam | |
| 8,358,321 B1 * | 1/2013 | Weidner | G09G 5/00 345/619 |
| 8,390,577 B2 | 3/2013 | Lemort et al. | |
| 8,416,206 B2 | 4/2013 | Carpendale et al. | |
| 8,487,888 B2 * | 7/2013 | Wigdor | G06F 3/04883 345/173 |
| 8,502,789 B2 * | 8/2013 | Tse | G06F 3/0425 345/173 |
| 8,896,632 B2 * | 11/2014 | MacDougall | G06F 1/1626 345/173 |
| 8,963,867 B2 * | 2/2015 | Narita | G06F 3/0488 345/173 |

(Continued)

OTHER PUBLICATIONS

International Search Report and Written Opinion—PCT/US2015/047926—ISA/EPO—dated Nov. 4, 2015.

*Primary Examiner* — Benyam Ketema

(74) *Attorney, Agent, or Firm* — Knobbe, Martens, Olson & Bear LLP

(57) ABSTRACT

Methods, devices, and computer program products for using touch orientation to distinguish between users are disclosed herein. In one aspect, a method of identifying a user of a touch device from a plurality of users of the touch device is described. The method includes receiving touch data from a touch panel of the touch device, the touch data indicating a user's touch on the touch screen. The method further includes determining an orientation of the user's touch based on the received touch data. Finally, the method includes identifying the user of the plurality of users which touched the device, based at least in part on the orientation of the touch.

24 Claims, 7 Drawing Sheets

(56) References Cited

U.S. PATENT DOCUMENTS

| | | | |
|---|---|---|---|
| 9,285,924 B2* | 3/2016 | Chen | G06F 3/042 |
| 9,367,086 B2* | 6/2016 | Yilmaz | G04G 9/0064 |
| 2004/0046784 A1* | 3/2004 | Shen | G06F 3/048 |
| | | | 715/733 |
| 2005/0285845 A1* | 12/2005 | Dehlin | G06F 3/0481 |
| | | | 345/173 |
| 2007/0092118 A1* | 4/2007 | Tachibana | A63F 13/10 |
| | | | 382/125 |
| 2007/0220444 A1* | 9/2007 | Sunday | G06F 3/0488 |
| | | | 715/788 |
| 2009/0085881 A1* | 4/2009 | Keam | G06F 3/0416 |
| | | | 345/173 |
| 2010/0066667 A1* | 3/2010 | MacDougall | G06K 9/00228 |
| | | | 345/156 |
| 2010/0083109 A1* | 4/2010 | Tse | A63F 13/10 |
| | | | 715/702 |
| 2010/0085323 A1 | 4/2010 | Bogue | |
| 2010/0285881 A1* | 11/2010 | Bilow | A63F 9/24 |
| | | | 463/37 |
| 2011/0115604 A1 | 5/2011 | Sobel et al. | |
| 2011/0134047 A1* | 6/2011 | Wigdor | G06F 3/04883 |
| | | | 345/173 |
| 2011/0193883 A1* | 8/2011 | Palais | G06T 13/20 |
| | | | 345/655 |
| 2012/0176308 A1 | 7/2012 | Westermann et al. | |
| 2013/0135218 A1* | 5/2013 | Jain | G06F 3/0488 |
| | | | 345/173 |
| 2015/0227289 A1* | 8/2015 | Nagara | G06F 3/0488 |
| | | | 715/808 |

* cited by examiner

Original Touch

A. θ, 2 Users, in Reference to Original Touch Direction

B. θ, 2 Users, in Reference to Squared OTD

C. θ, 4 Users, in Reference to OTD Nearest Corner

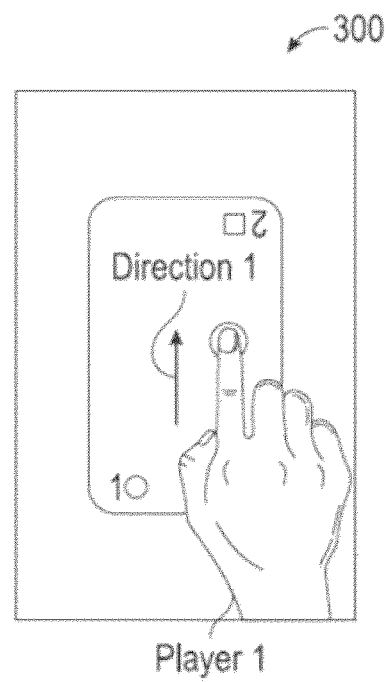
FIG. 3
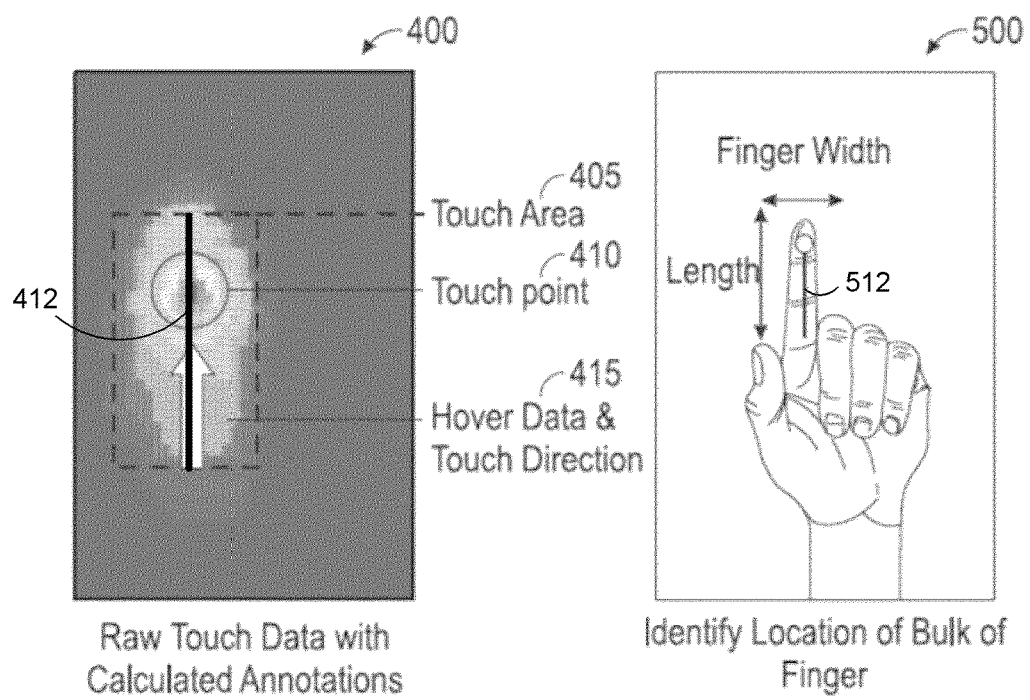
FIG. 4
FIG. 5

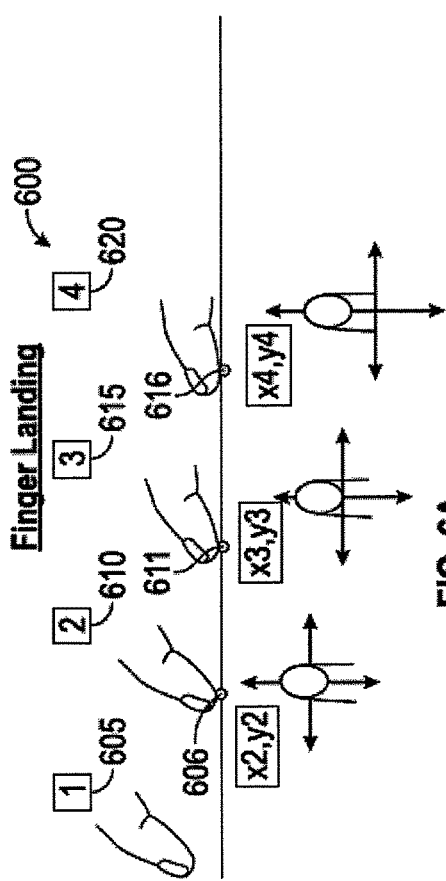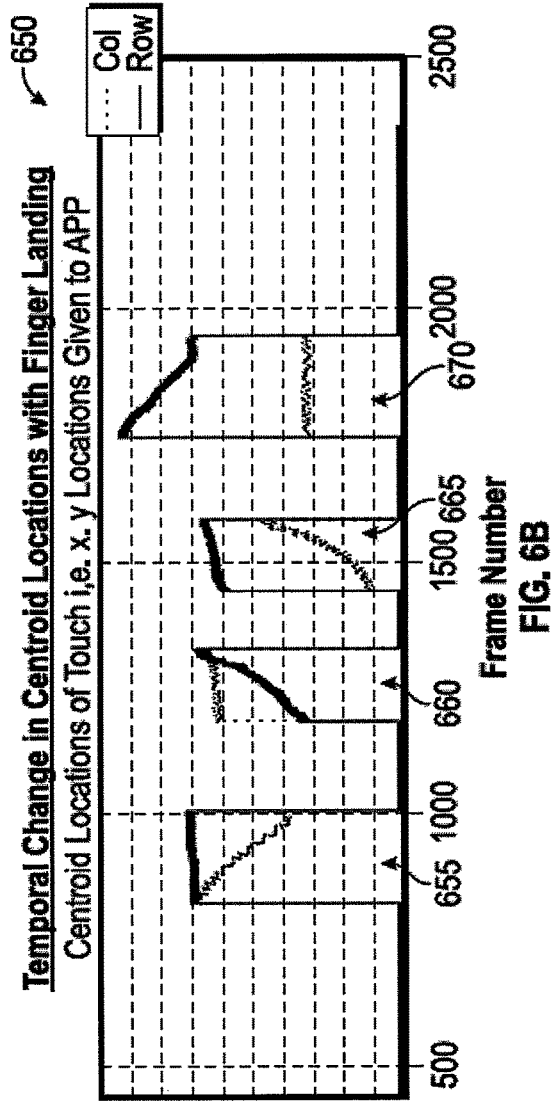

SYSTEM AND METHOD FOR USING TOUCH ORIENTATION TO DISTINGUISH BETWEEN USERS OF A TOUCH PANEL

FIELD

The present application relates generally to using touch orientation to distinguish between users of a touch device.

BACKGROUND

Touch devices may be used to a large number of purposes. However, on a touch device, it may be difficult to implement certain types of applications, such as applications which distinguish between different users. Examples of such applications may include multiplayer games, or applications such as word processors or drawing programs which allow collaboration. For these applications, it would be useful to identify who added a particular aspect of the collaboration. However, because of the way in which touch devices receive input (by touch), it may be difficult to distinguish between different simultaneous or contemporaneous users of a touch display. Accordingly, a system and method for using touch orientation to distinguish between users of a touch panel may be desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include using touch orientation to distinguish users of a touch device.

In some aspects, a method of identifying a user of a touch device from a plurality of users of the touch device is disclosed. The method includes receiving touch data from a touch panel of the touch device, the touch data including a touch, determining an orientation of the touch based on the received touch data, and identifying the user of the plurality of users which touched the device, based at least in part on the orientation of the touch.

Identifying the user may include identifying the user of the plurality of users based on the orientation of the touch and further based on stored information which includes information regarding orientations of previous touches of the device from each of the plurality of users. Identifying the user may include identifying a new user of the device based at least in part on stored information which includes information regarding orientations of previous touches of the device from each of the plurality of users. In some aspects, each of the plurality of users of the device may be associated with a range of touch orientations. In some aspects, the range of touch orientations for a particular user of the plurality of users may be based on a previous orientation of a touch from said particular user. The range of touch orientations for a particular user of the plurality of users may be based on a number of users of the device, or on an orientation of a side or a corner of the device. The method may also include determining a number of users of the device based, at least in part, on a difference between an orientation of a touch from a first user and an orientation of a touch from a second user. In some aspects, identifying the user may include, if the user can be identified based on the orientation of the touch, identifying the user of the plurality of users which touched the device, and, if the user cannot be identified based on the orientation of the touch, displaying an indication on the device which allows the user to identify which user of the plurality of users touched the device. In some aspects, identifying the user may include, if the user can be identified based on the orientation of the touch, identifying the user of the plurality of users which touched the device, and, if the user cannot be identified based on the orientation of the touch, ignoring the touch. In some aspects, determining an orientation of the touch based on the received touch data may include determining an orientation of the touch based on the received touch data based on one or more of touch area, hover data and touch timing data.

In some aspects, an electronic device for identifying a user of a touch device from a plurality of users of the touch device is disclosed. The device includes a touch panel and a processor configured to receive touch data from the touch panel, the touch data including a touch, determine an orientation of the touch based on the received touch data, and identify the user of the plurality of users which touched the device, based at least in part on the orientation of the touch.

One aspect of the present disclosure includes a computer program product comprising a non-transitory computer readable medium encoded thereon with instructions that when executed cause a wireless communications apparatus to perform a method of wireless communication. The method includes receiving touch data from a touch panel of the touch device, the touch data including a touch, determining an orientation of the touch based on the received touch data, and identifying the user of the plurality of users which touched the device, based at least in part on the orientation of the touch.

In some aspects, an electronic device for identifying a user of a touch device from a plurality of users of the touch device is disclosed. The device includes means for receiving touch data from a touch panel of the touch device, the touch data including a touch, means for determining an orientation of the touch based on the received touch data, and means for identifying the user of the plurality of users which touched the device, based at least in part on the orientation of the touch.

BRIEF DESCRIPTION OF THE DRAWINGS

FIG. 3 is a schematic illustrating an example of a direction of a touch from a user.

FIG. 4 illustrates an example of raw touch data which contains calculated annotations based on the raw touch data.

FIG. 5 is a schematic illustrating an example of using hover data to determine a user based on a determined touch direction.

FIG. 6A is a schematic illustrating an example of a touch sequence and how touch timing data may be used to determine a touch direction or orientation.

FIG. 6B is a graph illustrating an example of using touch timing to determine a touch direction or orientation.

DETAILED DESCRIPTION

Embodiments relate to systems, methods, and devices for using touch orientation to distinguish between users of a device that has a touch panel. For example, the methods contained herein may be used on any device with a touch panel display, including tablet computers, cellular telephones, and other devices.

Touch screen devices are very popular and may be used for a number of different tasks. For certain tasks, it may be desirable to allow multiple people to participate, and to allow a device to recognize which of the multiple people should be associated with any given touch. For example, it may be desirable to offer multiplayer gaming on a touch device, and thus, it may be useful if the device is capable of recognizing different users and determining which user is responsible for any given touch on a touch screen of the device. This may be especially desirable for types of multiplayer gaming where two or more users may touch the screen at any given time, as opposed to a turn-based multiplayer game. Identifying multiple different users of a touch device may also be useful in other contexts as well as gaming, such as in a classroom or another setting where it may be appropriate to distinguish between multiple users of an application on a touch screen device.

Figure 1:
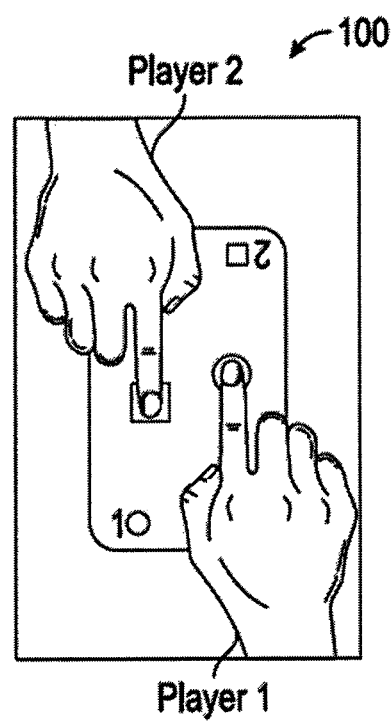
FIG. 1 is an illustration of two users using a touch screen device simultaneously.

FIG. 1 is an illustration 100 of two users using a touch screen device simultaneously. For example, the touch screen device may be a portable device that is placed on a table. Users may sit on opposite sides of the device in order to both use an application, such as a game, which allows multiple simultaneous users or players. In some embodiments, the touch screen device (or system) may be built into a table, desk or other surface of a fixed or movable structure in for example, a house of a business.

Previous attempts have been made to allow multiple users to use a touch-screen device at once. For example, large touch surface devices, such as a table-top device, may detect each user's face via computer to determine the user's location and then dedicate the area around that face to that user. This may not work on a smaller system however, where any user may touch any area of the screen, due to the smaller screen size. Other large displays may user infrared sensors mounted under the display, which can detect any movement of objects above the display, including hand movements. However, these infrared sensors may not be able to determine whether movement is movement of a hand or that of a finger. This system may also require a significant amount of hardware and associated cost. In other systems, touch data may be analyzed by a touch processor to determine a centroid of the X and Y coordinates of the touched area in a capacitive touch screen, or the point where the electrical field change occurs in a resistive touch screen. However, only touch point centroid coordinates may be passed to the other components of the device, and the touch processor may not give any orientation data with which to distinguish between two or more users of the device. Accordingly, such touch processing may not be suitable for multiplayer gaming or other applications, where a touch at any point on the screen at any time may be associated with one of two or more different users.

Accordingly, it may be desired to have a system and a method which would enable detection of which user is touching a screen, without forcing users to only touch a certain portion of the screen, and without requiring additional hardware. In some embodiments, devices and methods disclosed herein may be configured to determine which direction or orientation a user is touching a screen from, without requiring additional components such as infrared sensors. Such a system may distinguish between motion of a hand and motion of a finger, as infrared systems may be unable to distinguish between the two, and may fail to properly recognize the orientation of a touch based on this. Such methods and systems can allow for simultaneous multi-user interaction on a device. Embodiments of these devices and methods can use touch sensor data from sensors already on a touch panel, so no additional sensors are needed. Enabling a touch device to distinguish between two or more different users may allow the development of a number of different types of applications which allow for multiple simultaneous users, such as multiplayer gaming applications which may not be possible using previous technologies.

A number of different applications that are running on a computer device with a touch panel interface may recognize different users, and may treat those users differently based on this recognition. These applications may be existing applications as well as new multi-user applications which may be developed. For example, actions from each user may affect the interface in different ways. In a game, touches from a first direction may be scored for Player 1 and touches from a second direction may be scored for Player 2. Similarly, touches from other directions may correspond to additional players. In an academic setting, touches from a first direction may be interpreted as Student Actions such as answering or writing content, while touches from a second direction may be interpreted as Teacher Actions and thus appear as "red line" corrections and comments in a document, for example. In a photo gallery, touches from a first direction may have Owner Access such as sharing and deleting, while touches from a second direction may have Guest Access such as zooming and panning. In a note-taking or a drawing application, touches from a first direction and a second direction may appear differently on screen. For example, the "strokes" from each direction in a drawing application may be in a different color(s), a different line width or other graphical depiction of the stroke (for example, dots or dashed line) to indicate which user drew a particular portion of a drawing.

In other aspects, a device (and/or an application running on the device, which for clarity may be sometimes referred to herein collectively or separately as "device") may be configured to orient some elements on a display relative to a first direction, and another set of user interface elements may be oriented relative to a second direction. These directions may correspond to directions associated with each of two or more users of the device. For example, the device may be configured to first identify at least two different users of the device (as described herein) associate certain interface or display elements with each user, and then display the interface and/or display elements in a certain orientation relative to each user. For example, in a game, the score for Player 1 may be oriented towards the touch direction of Player 1, while the score for Player 2 may be oriented towards the touch direction of Player 2, and so on for additional players. Additionally, each player may be provided with certain user interface elements, such as on-screen buttons which have associated game actions. An application may "lock" these buttons, such that only a particular player (or subset of players) may use those buttons. For example, in a game, Player 2 may have certain user interface elements oriented towards Player 2, and buttons in that user interface may be configured to only respond to touches from the direction of Player 2. Similarly, in a teacher/student environment, a teacher may have certain buttons which may only be pressed from the known direction of the teacher, rather than from other directions, such as a student direction. In another example, a user name for a given user may be oriented towards that user. In another example, two or more different sets of user interface elements, such as tools, may be aligned, one set to each user, such that a Teacher has a redline and grade tools, while a student has typing and drawing tools. In another example, when collaborating, user interface elements such as drawing tools may appear in two or more redundant sets, with one set oriented to each user. A device may include any one or multiple of these features as desired.

In some aspects, use of the disclosed methods may result in an improved or enhanced experience for users of a device with a touch panel interface, whether used in entertainment or work. For example, two users may approach one tablet. For example, the tablet may be sitting on a table, and the users may initiate a two-player game. User 1 may touch the tablet from Direction 1. The device may be configured to determine the direction of a finger to be from Direction 1. Accordingly, the device may associate the touch with User 1, such as perhaps the touch might score a point for User 1, depending on the type of game which is being played. Next, User 2 may touch the tablet from Direction 2. The tablet may be configured to determine the direction of the finger to be from Direction 2. Accordingly, the tablet may be configured to determine that the touch was from User 2, and may react accordingly, such as scoring points based on the touch for User 2. Similarly, as additional users are added to the game, the tablet may be configured to identify those additional users, and treat their touches appropriately. Further, in some aspects, User 1 and User 2 may touch the screen simultaneously, and the device may be configured to determine the direction of each touch, and assign points (or otherwise react) appropriately to reflect this. Thus, aspects of the present disclosure may allow for easy identification of new players or new users.

In some aspects of the embodiments of methods and devices disclosed herein, at least two users positioned in certain locations, relative to a touch panel display, may touch any place on the touch panel display and the system may recognize which of the two or more users touched the touch panel display. For example, a device may be capable of (or configured to) recognize that User 1 touched the screen from a particular direction or orientation. Accordingly, for a subsequent (or future) touch, the device may calculate a deviation between the orientation of the first touch from User 1 and an orientation of a subsequent touch. In some embodiments, a range of possible orientation deviations Θ may be allotted to each of one or more users, for example, 2, 3, 4, or 5 (or more) users. This range of possible orientation deviations may be based, at least in part, on the relative orientations or positions of the multiple users of the touch panel device.

Figure 2A:
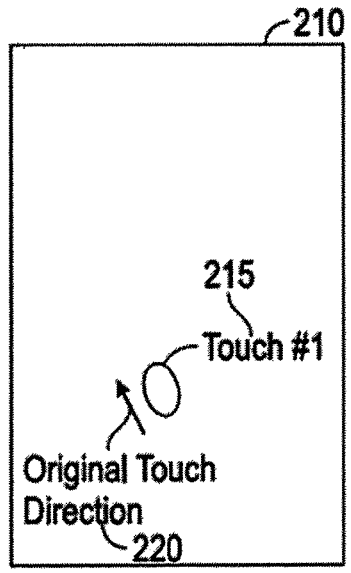
FIG. 2A illustrates aspects of an embodiment of identifying a user based upon a touch direction.
Figure 2B:
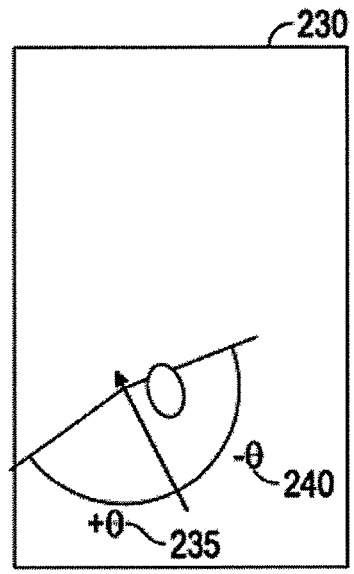
FIG. 2B illustrates aspects of an embodiment identifying a user based upon a touch direction in, for example, a two-user scenario.
Figure 2C:
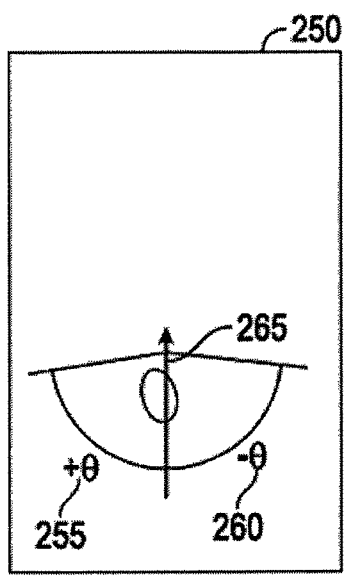
FIG. 2C illustrates aspects of an embodiment is further identifying a user based upon a touch direction and the orientation of the side of the display in, for example, a two-user scenario.
Figure 2D:
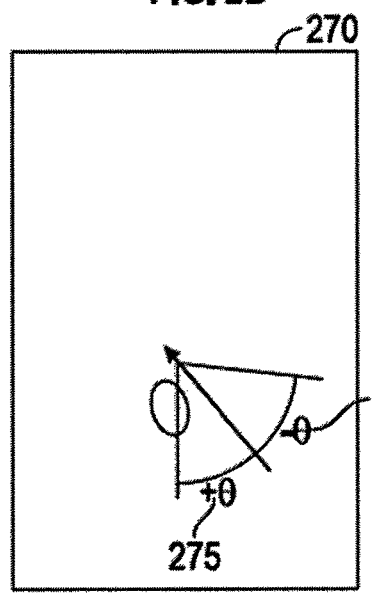
FIG. 2D illustrates aspects of an embodiment is illustration identifying a user based upon a touch direction and the orientation of the corner of the display in, for example, a four-user scenario.

FIGS. 2A-2D illustrate various aspects related methods and configurations of devices that can determine which user, of a plurality of users, touched a touch panel display, for example, for two users (FIGS. 2A-2C) or for four users (FIG. 2D). In particular, FIG. 2A is an illustration depicting certain aspects of an example of a method of identifying a user based upon a touch direction on a touch panel device. In block 210, a first touch 215 may be detected. Based upon raw touch data or other methods, the device may determine an Original Touch Direction 220. For example, the Original Touch Direction 220 may be a direction which points from a user's hand to the tip of the user's finger. The device may associate the Original Touch Direction 220 with a particular user, such as User 1. Determined associations may be stored in memory, for example, in a database or look-up table. Subsequent touches of the touch panel display that are received which are from the direction (or orientation) of Original Touch Direction 220 can be identified as touches also from User 1. In some embodiments, a range of directions may be associated with User 1, such that touches from any number of directions that are within the range of directions will be determined to have come from User 1. For example, User 1 may be associated with the Original Touch Direction 220, as well as a range of directions on both sides of this direction. Such a range may be useful as a user's touch on a device may be from a slightly different direction each time, and a user's direction of touch on a device may vary based on the portion of the screen the user is touching.

FIG. 2B is another illustration of an example of a method of identifying a user based upon a touch direction in, for example, a two-user scenario. For example, as illustrated in block 230, in a two-user situation, User 1 may be assigned a range of orientations which corresponds to the Original Touch Direction 220 plus Θ 235 or minus Θ 240. In a two-user situation, the value of Θ may be any value up to approximately 90 degrees (so that each user is associated with a range of directions of up to approximately 180 degrees). In some aspects, the value of Θ may be based, at least in part, on the difference in direction between touches from User 1 and touches from User 2. For example, in some aspects, User 1 and User 2 may be seated on opposite sides of a screen, such that their touches may be approximately 180 degrees apart. In such a scenario, the value of Θ may be up to 90 degrees. In some aspects, different values of Θ may be used for plus Θ 235 and for minus Θ 240. As illustrated in block 230, the values of plus Θ 235 and minus Θ 240, assigning a range of orientations to User 1, may by assigned based on the Original Touch Direction 220.

FIG. 2C illustrates aspects related to an example of a method of identifying a user based upon a touch direction and the orientation of the side of the display, for example, in a two-user scenario. For example, as illustrated in block 250, the values of plus Θ 255 and minus Θ 260 may be based on the angle of the tablet itself, rather than the Original Touch Direction 220. For example, as illustrated, User 1 may be assigned a range of directions based on the direction 265, which is normal to the edge of the tablet screen. In some aspects, which direction 265 is assigned to a particular user may be based on both the Original Touch Direction 220 and based on the orientation of the tablet. For example, the center of the directions assigned to a given user may be based on the normal direction of the screen which is closest to Original Touch Direction 220. In other aspects, directions assigned to given users may be based on the direction from the corners of the screen or other directions based upon the orientation of the screen.

FIG. 2D illustrates aspects related to an example of a method of identifying a user based upon a touch direction and the orientation of the corner of the display, in a four-user scenario. As in the previous block, in block 270, the touch directions assigned to a particular user are based at least in part on an orientation of the screen. In this case, the touch direction assigned to the user is centered on an orientation from the corner of the screen. Because block 270 relates to a four-user scenario, each user may be assigned about 90 degrees of touch direction. For example, as illustrated, the values of plus Θ 275 and minus Θ 280 may be based on the angle of the tablet itself, such as the angle from the corner of the screen to the center of the screen.

As illustrated in FIGS. 2A-2D, the deviation Θ may be in reference to a given touch, to a particular side of the tablet, to a corner of the tablet, and/or to a first touch orientation which has been squared to the nearest 90° (or other amount of degrees) of the tablet orientation. In some aspects, the deviation range between +and −Θ may be approximately 180°, to allow two users, or approximately 90°, to allow four users. In some aspects, the deviation range may be approximately 360°/N, to allow N users.

Figure 2E:
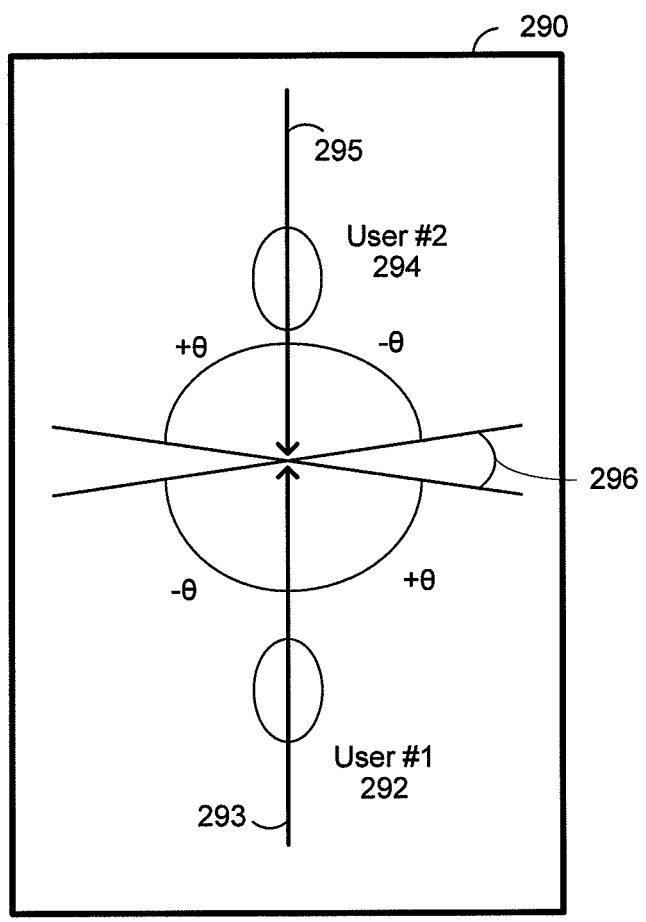
FIG. 2E illustrates a boundary area between two users of a touch screen.

In various embodiments, the deviation range may be smaller than the above, and areas between existing users may result in the system responding differently. These areas between users may be referred to as boundary areas. For example, FIG. 2E illustrates 290 a boundary area between two users of a touch screen. User #1 292 touches the screen from a first direction 293, here illustrated as being from the bottom of the screen. Based upon the first direction 293, User #1 may be assigned a certain range of directions, here given by +and −Θ. In some aspects, the value of Θ may depend on various factors, such as the number of users of the screen, and the range of directions that a single user may touch the screen from. User #2 294 may also touch the screen, either at the same time or at a different time, from a second direction 295. For example, User #2 294 may be seated across the table from User #1 292, and the touch device may be placed onto a table (or may be a table). Accordingly, User #2 may be assigned a range of directions, which may also be based on +and −Θ. In some aspects, the values of Θ need not be the same for both users, and users need not be assigned the same range of directions in both the positive and negative Θ directions. From illustration 290, it may be observed that the values of Θ may be chosen such that the touch direction ranges of User #1 292 and User #2 294 do not overlap, and there is a boundary area 296 between the ranges of both users. Touches in the boundary area 296 may be addressed differently than touches which are more closely aligned with a given user, such as touches which are closer to the direction of previous touches from a given user. For example, the users may be prompted for clarification regarding touches that are in boundary area 296. For example, a dialog box may be opened in the application, asking which user touched the device or if the touch was from a new user. A system (or device) configured to identify different users that are providing input to the same touch display panel may also use an additional means for clarification of such touches, such as face detection to determine which user may have touched the screen when a touch is between two users. In some embodiments, a touch panel device may be configured to ignore touches which are at the boundaries between users. In some embodiments, a touch panel device can produce a visual or audio (feedback) signal to a user that the touch is in a boundary area between two users to indicate that the user needs to provide additional input, for example, another touch. In some embodiments, a user may be visually signaled that a touch is in a boundary by the display of a certain color or symbol on the touch panel. In some embodiments, a user may be signaled that a touch is in a touch boundary by a emitting a sound, from the touch panel display device, that is associated with an improper input or touch.

FIG. 3 is an illustration of the direction of a touch from a user. In some aspects, the direction of the touch may be a direction pointing from the user to the tablet. In some aspects, the touch direction may also be thought of as being the opposite direction, from the screen to the user. As illustrated, the direction of the touch is the direction which points along a user's finger when the user is touching the touch panel.

In some embodiments, the touch screen used may use either capacitive sensing, or be a resistive touch screen. Other types of touch screen technology may also be used, as appropriate. A number of different methods may be used to determine the direction of a touch. For example, a capacitive touch screen may be able to collect hover data, for example, data related to one or more fingers or other objects which are near, but not touching, the screen. "Near" as used here, refers to a position of a finger (e.g., or fingers or stylus) that is close enough to a touch panel display to cause the touch panel display to generate a signal based on the proximity of the finger (e.g., or fingers or stylus). This hover data may be used to determine an aspect ratio of the touch, which can be used to determine touch directions. In addition, touch timing data may be used to determine a touch direction. A size, aspect ratio, and direction of a touch area may also be used. These methods may use raw touch data to determine a touch direction or a touch orientation, which can then be used to determine the associated user. In some aspects, a touch area, touch timing data, and hover data may be used individually or together, in any combination, in order to determine a touch direction. Generally, it may be more robust to use touch data and hover data together to determine an aspect ratio, from which direction may be derived.

Generally, the device may determine a touch direction according to one of these methods, or another method. The device may determine a touch direction and determine which user was responsible for the touch, and then pass the user information along to the user interface. For example, this user information may be passed along to the user interface through an API. In some aspects, the API may present the direction of the touch to an application, and the correlation between this direction and a given user may be done by an application itself or in a higher level of the device. In other aspects, the API itself may identify the user itself, and pass that information along to applications.

FIG. 4 is an illustration 400 of raw touch data which contains calculated annotations based on the raw touch data. For example, a user may place a finger on a touch screen or any touch input area of a device. This touch may be done to perform a specific touch input, or for the purpose of establishing a touch screen orientation (such as in an "identify users" portion of an application). Based on this touch, a device may capture raw touch data, as shown in illustration 400. This raw touch data may include, for example, capacitance changes across the screen. Based on this touch data, the device may process the raw touch data in order to determine a touch area 405. This touch area 405 is the width, height and position of the overall active area of the touch display—that is, the area in which touch signal levels are larger than normal. The width and the height of the touch area 405 need not align with the horizontal or the vertical of the device itself. That is, the touch area 405 need not be a rectangle as defined by the x- and y-coordinates of the touch screen, but may be "rotated" appropriately to correspond to the touch itself. The touch area 405 may include the actual areas of the screen which were touched by a finger, as well as areas of the screen where a finger hovered a certain distance (for example, a few millimeters) from the screen.

Next, the device may be configured to calculate an aspect ratio of the touch area. For example, the device may determine which axis is longer, and establish this direction as an Axis Direction 412 or Axis Direction 512 in FIG. 5. The Axis Direction 412 may be a line running in the direction of the length of the finger, because generally fingertip prints are longer than they are wide. Accordingly, this axis direction may also correspond to a touch direction. This touch direction may extend from the hand of a user to the end of a user's fingertip, and may be inferred from hover data as well as other sources. Hover data may be differentiated from touch data, since hover data may be associated with lower amplitude change in capacitance. For example, areas of the screen which were directly touched may show a much larger amplitude change in capacitance, while areas which were hovered may show a smaller change in capacitance. However, these "hover" areas may still have a measurable change in capacitance, and it may be possible to differentiate such areas from areas where an object did not hover over the screen. If the touch area includes areas where a finger merely hovered rather than touches, the touch area may be divided into two halves along the longest touch axis. Based on this division, the half of the touch area which contains hover data may be used to determine a touch direction. This touch direction may correspond with a direction from a user's hand to a user's fingertip.

FIG. 5 is an illustration 500 of determining a touch direction based on hover data. In illustration 500, a finger is shown touching a touch screen. As illustrated, a finger may have a much smaller width than length. Raw touch data, such as hover data, may allow the device to recognize the length and width of a finger. For example, hover data may be used to detect the portion of the finger which is not touching the screen, but which is in close proximity to the screen. In a capacitive touch screen, the screen may be sensitive enough to detect changes in capacitance of the screen based not only on direct touches, but also changes based upon objects, such as a portion of a finger, which are very near the screen. Accordingly, this data may be used to determine a touch direction which may, as illustrated, by a direction pointing from a user's hand to the end of a user's fingertip. Accordingly, a device may use this touch direction to determine which of two or more users may be touching the screen. For example, when a user touches the screen, the device may be configured to compare the orientation of the touch to the orientations of previous touches from known users. This may allow the device to determine which user of a plurality of users touched the device, based on the direction or orientation of the touch.

FIGS. 6A and 6B are illustrations 600, 650 which show how touch timing data may be used to determine a touch direction or orientation. Touch timing data may contribute to confidence in touch direction, or may be used for determining touch direction when hover data or other sources of information are not available. For example, when a fingertip is touching the screen but the rest of the finger is too high from the screen to register a change in capacitance of a capacitive touch screen, touch timing data may be used to determine a touch direction. In order to collect touch timing data, the device may sample the touch area multiple times at a high rate. For example, the device may sample the touch area at a rate of 60 times per second, 120 times per second, or another rate. In some aspects, the device may be configured to make a histogram of a temporal change in centroid location during finger landing, spanning from initial contact to full touch contact with the touch screen. It may be observed that as a finger moves from an initial touch to a full touch, this centroid position changes in predictable ways and helps to reveal a touch direction.

The device may then analyze the axis and direction of the temporal change of the centroid locations to determine the orientation of the finger and thus a touch direction. Generally, as a finger lands on a touch screen, the location of the centroid along the axis of the length of the finger exhibits significantly greater change than is seen in the axis of the perpendicular to the finger. Additionally, the direction of change in centroid location along the axis of the finger is towards the user's palm and away from the fingertip. Thus, this change in centroid location may be used to help determine a touch direction or touch orientation.

Illustration 600 illustrates the movement of the finger location as a finger moves from off the screen 605, initial contact 610, mid-contact 615, and to full contact 620. Each of initial contact 610, mid-contact 615, and full contact 620 have a different centroid location 611, 616, 621. As illustrated, the centroid location 611 of initial contact 610 is much closer to the tip of the finger than the centroid location 621 at full contact 620. Further, it may be observed that when transitioning from initial contact 610 to full contact 620, the width of the contact does not change significantly. However, the length of the finger contact and hover data may change significantly, as more of the finger may be closer to the screen during full contact 620 than at initial contact 610. Thus, both the centroid location of the finger as it lands on a screen and the change in length and width of the touch area as a finger lands may be useful in determining a touch direction.

Illustration 650 further illustrates the temporal change in centroid locations with finger landing. In this illustration, the row and column information for a centroid location is plotted during four finger landings 655, 660, 665, 670 on a touch screen. Each of these four landings reflect a finger landing on the touch screen at an angle that is approximately in line with one of the four sides of the touch screen. That is, for example, finger landings which may occur if a user touches the screen from each of the four sides of the screen, such as if the screen is sitting flat on a table, and four users are placed around the screen, one at each side. As illustrated in illustration 650, with each finger landing, only one of the column and the row location of the centroid exhibits significant change, while the other remains roughly stationary. For example, in landing 655, a row centroid location is largely unchanged through a finger landing. However, a column centroid location changes greatly, in a downward direction. Accordingly, as above, a user's location may be inferred by the movement of this centroid location during a finger landing. For example, if an arrow is drawn from the centroid location of the finger location at full contact to the centroid of the initial finger landing, this direction may correspond to a touch direction of the touch. As noted above, touch direction may be drawn in either direction (either towards the user, or away from the user), as long as this direction is used consistently. Accordingly, touch timing data may be used to determine or to confirm a touch direction along with other methods, such as hover data.

Figure 7:
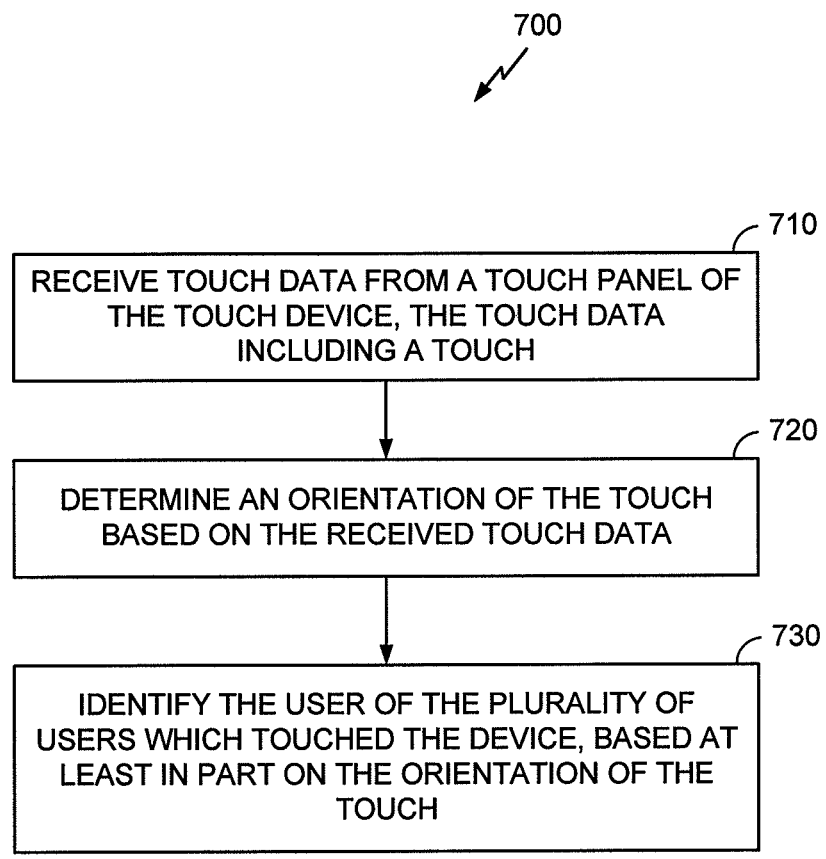
FIG. 7 is an example of a flowchart illustrating an embodiment of a method for identifying a user of a touch device based on a touch direction.

FIG. 7 is an exemplary block diagram 700 illustrating a method for identifying a user of a touch device based on a touch direction. In some aspects, this method may be used by a device which incorporates a touch screen. For example, this method may be used by a tablet, a mobile phone, or any other type of device which incorporates a touch screen. This method may allow such a device to recognize a user based upon that user touching the screen with their finger, and may allow a user to be recognized without the user having to specify which user is touching the screen.

At block 710, the device receives touch data from a touch panel of the touch device, the touch data including a touch. In some aspects, the touch data may be used to determine, for example, touch timing data, hover data, and a touch area. This touch data may be raw touch data, as gathered by a capacitive or a resistive touch screen. In some aspects, resistive touch screens may be unable to get hover data, although the methods described herein with respect to touch area and touch timing may still be used with such screens. In some aspects, the means for receiving touch data may include a processor.

At block 720, the device determines an orientation of the touch based on the received touch data. For example, the received touch data may be used to generate a touch direction, or an orientation of the touch, based on one or more of touch timing data, hover data, a touch area, or using another method. Accordingly, this touch data may be used to generate an orientation of the touch, such as a direction of a user's finger from their palm. This orientation may provide an indication of, for example, where around a touch panel a user is seated. In some aspects, the means for determining an orientation may include a processor.

At block 730, the device identifies the user of the plurality of users which touched the device, based at least in part on the orientation of the touch. For example, the device may be aware of two users of the device, and know orientations of previous touches for those users. Accordingly, when the device is touched again, the device may determine the orientation of the touch, and compare this orientation to that of previous touches in order to determine which of the two users touched the device. In some aspects, the device may be configured to ignore touches which come from new directions, or directions which are on the boundary between two known users. In some aspects, in such a touch the device may prompt users to indicate which user is responsible for the touch. In some aspects, the means for identifying the user of the plurality of users may include a processor.

Figure 8:
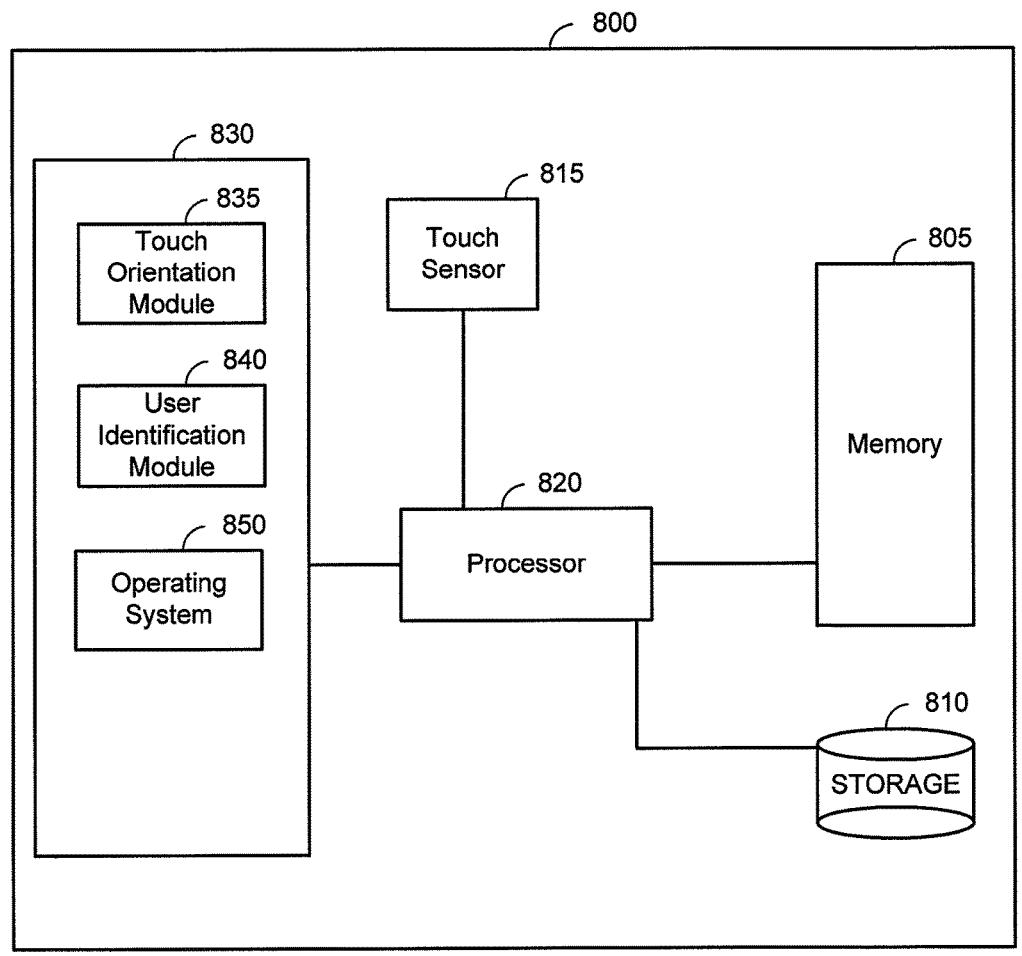
FIG. 8 depicts an example of an embodiment of a block diagram of a device having a set of components including a processor operatively coupled to a touch sensor.

FIG. 8 depicts a high-level block diagram of a device 800 having a set of components including a processor 820 operatively coupled to a touch sensor 815. A working memory 805, storage 810, and memory 830 are also in communication with and operative attached to the processor. Device 800 may be a device configured to receive touch inputs, and to determine an orientation of those touch inputs. For example, device 800 may be a device with a touch screen, such as a computer, a laptop computer, a digital camera, a mobile phone, a tablet computer, or another device.

The touch sensor 815 may be configured to capture or receive a number of touch inputs, such as inputs on a touch screen. Each of these inputs may be associated with a location on the screen, and with a particular pressure on the screen. The touch sensor 815 may be coupled to the processor (or "touch processor") 820. The processor 820 may be configured to perform various operations on received touch inputs in order to calculate a position of the touch input.

Processor 820 may be a general purpose processing unit or a processor specially designed for the disclosed methods. As shown, the processor 820 is connected to a memory 830 and a working memory 805. In the illustrated embodiment, the memory 830 stores touch orientation module 835, user identification module 840 and operating system 850. These modules include instructions that configure the processor to perform various tasks. Working memory 805 may be used by processor 820 to store a working set of processor instructions contained in the modules of memory 830. Alternatively, working memory 805 may also be used by processor 820 to store dynamic data created during the operation of device 800.

As mentioned above, the processor 820 is configured by several modules stored in the memories. For example, the touch orientation module 835 may include instructions that configure the processor 820 to determine an orientation of a touch received on the touch sensor 815. For example, this orientation may correspond to a direction of a user's finger or hand, as that user touches the touch sensor 815. The touch orientation module 835 may include instructions that configure the processor 820 to determine such an orientation.

The memory 830 may also contain a user identification module 840. The user identification module 840 may contain instructions that configure the processor 820 to identify a user based on information determined by the touch orientation module 835. For example, the touch orientation module 835 may be used to determine an orientation of a touch. This information may be used by the user identification module 840 to identify a user who was responsible for the touch, based on this orientation.

Operating system module 850 configures the processor to manage the memory and processing resources of device 800. For example, operating system module 850 may include device drivers to manage hardware resources such as the image sensor 815 or storage 810. Therefore, in some embodiments, instructions contained in modules discussed above may not interact with these hardware resources directly, but instead interact through standard subroutines or APIs located in operating system component 850. Instructions within operating system 850 may then interact directly with these hardware components.

Processor 820 may write data to storage module 810. While storage module 810 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 8 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 8 shows two memory components, to include memory component 830 having several modules, and a separate memory 805 having a working memory, one with skill in the art would recognize several embodiments utilizing different memory architectures. For example, a design may utilize ROM or static RAM memory for the storage of processor instructions implementing the modules contained in memory 830. Alternatively, processor instructions may be read at system startup from a disk storage device that is integrated into device 800 or connected via an external device port. The processor instructions may then be loaded into RAM to facilitate execution by the processor. For example, working memory 805 may be a RAM memory, with instructions loaded into working memory 805 before execution by the processor 820.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-8 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of identifying a user of a touch device from a plurality of users of the touch device, the method comprising:
   receiving first touch data from a touch panel of the touch device by each of the plurality of users, the touch data generated by a first touch from each of the plurality of users;
   determining an orientation of the first touch by each of the plurality of users based on the received touch data;
   assigning an original range of touch directions for each of the plurality of users based on the received touch data such that each user is assigned to a different original range of touch directions from each other user, the original range of touch directions for each of the plurality of users including a non-zero value of θ degrees in relation to the orientation of the first touch;
   receiving second touch data from the touch panel of the touch device, the second touch data generated by a second touch from one of the plurality of users;
   determining an orientation of the second touch based on the received second touch data; and
   identifying which user of the plurality of users performed the second touch, regardless of an area of the touch panel where the second touch was received, based on the orientation of the second touch and one or more of the assigned original ranges of touch directions.

2. The method of claim 1, further comprising identifying a new user of the device based at least in part on stored information which includes information regarding orientations of previous touches of the device from each of the plurality of users.

3. The method of claim 1, wherein the range of touch directions for a particular user of the plurality of users is based on a number of users of the device.

4. The method of claim 1, wherein the range of touch directions for a particular user of the plurality of users is based on an orientation of a side or a corner of the device.

5. The method of claim 1, further comprising determining a number of users of the device based, at least in part, on a difference between a first orientation of the first touch from a first user of the plurality of users and a second orientation of the first touch from a second user of the plurality of users.

6. The method of claim 1, wherein identifying the user comprises:
   if the user can be identified based on the orientation of the second touch, identifying the user of the plurality of users which touched the device; and
   if the user cannot be identified based on the orientation of the second touch, displaying an indication on the device which allows the user to identify which user of the plurality of users touched the device.

7. The method of claim 1, wherein identifying the user comprises:
   if the user can be identified based on the orientation of the second touch, identifying the user of the plurality of users which touched the device; and
   if the user cannot be identified based on the orientation of the second touch, ignoring the second touch.

8. The method of claim 1, wherein determining an orientation of the second touch based on the received second touch data comprises determining an orientation of the second touch based on one or more of touch area, hover data and touch timing data.

9. An electronic device for identifying a user of a touch device from a plurality of users of the touch device, the device comprising:
   a touch panel; and
   a processor configured to:
      receive first touch data from the touch panel by each of the plurality of users, the touch data generated by a first touch from each of the plurality of users,
      determine an orientation of the first touch by each of the plurality of users based on the received first touch data,
      assigning an original range of touch directions for each of the plurality of users based on the received touch data such that each user is assigned to a different original range of touch directions from each other user, the original range of touch directions for each of the plurality of users including a non-zero value of θ degrees in relation to the orientation of the first touch,
      receive second touch data from the touch panel, the second touch data generated by a second touch from one of the plurality of users one any area of the touch panel,
      determine an orientation of the second touch based on the received second touch data, and
      identify which user of the plurality of users performed the second touch, regardless of an area of the touch panel where the second touch was received, based on the orientation of the second touch and one or more of the assigned original ranges of touch directions.

10. The device of claim 9, further comprising identifying a new user of the device based at least in part on stored information which includes information regarding orientations of previous touches of the device from each of the plurality of users.

11. The device of claim 9, wherein the range of touch directions for a particular user of the plurality of users is based on a number of users of the device.

12. The device of claim 9, wherein the range of touch directions for a particular user of the plurality of users is based on an orientation of a side or a corner of the device.

13. The device of claim 9, the processor further configured to:
   determine a number of users of the device based, at least in part, on a difference between a first orientation of the first touch from a first user of the plurality of users and a second orientation of the first touch from a second user of the plurality of users.

14. The device of claim 9, wherein identifying the user comprises:
    if the user can be identified based on the orientation of the second touch, identifying the user of the plurality of users which touched the device; and
    if the user cannot be identified based on the orientation of the second touch, displaying an indication on the device which allows the user to identify which user of the plurality of users touched the device.

15. The device of claim 9, wherein identifying the user comprises:
    if the user can be identified based on the orientation of the second touch, identifying the user of the plurality of users which touched the device; and
    if the user cannot be identified based on the orientation of the second touch, ignoring the second touch.

16. The device of claim 9, wherein determining an orientation of the second touch based on the received second touch data comprises determining an orientation of the second touch based on the received second touch data based on one or more of touch area, hover data and touch timing data.

17. A computer program product comprising a non-transitory computer readable medium encoded thereon with instructions that when executed cause a wireless communications apparatus to perform a method of wireless communication, said method comprising:
    receiving first touch data from a touch panel of a touch device by each of a plurality of users, the touch data generated by a first touch from each of the plurality of users;
    determining an orientation of the first touch by each of the plurality of users based on the received touch data;
    assigning an original range of touch directions for each of the plurality of users based on the received touch data such that each user is assigned to a different original range of touch directions from each other user, the original range of touch directions for each of the plurality of users including a non-zero value of θ degrees in relation to the orientation of the first touch;
    receiving second touch data from the touch panel of the touch device, the second touch data generated by a second touch from one of the plurality of users;
    determining an orientation of the second touch based on the received second touch data; and
    identifying which user of the plurality of users performed the second touch, regardless of an area of the touch panel where the second touch was received, based on the orientation of the second touch and one or more of the assigned original ranges of touch direction.

18. The computer program product of claim 17, the instructions further causing an apparatus to determine a number of users of the device based, at least in part, on a difference between a first orientation of the first touch from a first user of the plurality of users and a second orientation of the first touch from a second user of the plurality of users.

19. An electronic device for identifying a user of a touch device from a plurality of users of the touch device, the device comprising:
    means for receiving first touch data from a touch panel of the touch device by each of the plurality of users, the touch data generated by a first touch from each of the plurality of users;
    means for determining an orientation of the first touch by each of the plurality of users based on the received touch data;
    means for assigning an original range of touch directions for each of the plurality of users based on the received touch data such that each user is assigned to a different original range of touch directions from each other user, the original range of touch directions for each of the plurality of users including a non-zero value of θ degrees in relation to the orientation of the first touch;
    means for receiving second touch data from the touch panel of the touch device, the second touch data generated by a second touch from one of the plurality of users on any area of the touch panel;
    means for determining an orientation of the second touch based on the received second touch data; and
    means for identifying which user of the plurality of users performed the second touch, regardless of an area of the touch panel where the second touch was received, based on the orientation of the second touch and one or more of the assigned original ranges of touch directions.

20. The device of claim 19, further comprising means for determining a number of users of the device based, at least in part, on a difference between a first orientation of the first touch from a first user of the plurality of users and a second orientation of the first touch from a second user of the plurality of users.

21. The method of claim 1, wherein the first touch data and the second touch data are received via a touch panel of the device.

22. The method of claim 1, wherein the orientation comprises a direction which points from a user's hand to the tip of a user's finger or a direction of the user's finger.

23. The method of claim 1, wherein the orientation is determined based on an aspect ratio of the touch identified from hover data.

24. The method of claim 1, wherein θ may be based, at least in part, on a difference in directions between touches from different users.

* * * * *